(12) United States Patent
Miller

(10) Patent No.: US 6,760,653 B2
(45) Date of Patent: Jul. 6, 2004

(54) ELECTRIC POWER ASSISTED STEERING SYSTEM HAVING A SINGLE INTEGRATED CIRCUIT WITH TWO PROCESSORS

(75) Inventor: Joseph D. Miller, Farmington Hills, MI (US)

(73) Assignee: TRW Inc., Lyndhurst, OH (US)

( * ) Notice: Subject to any disclaimer, the term of this patent is extended or adjusted under 35 U.S.C. 154(b) by 70 days.

(21) Appl. No.: 09/858,103

(22) Filed: May 15, 2001

(65) Prior Publication Data

US 2002/0173890 A1 Nov. 21, 2002

(51) Int. Cl.[7] ................................................ B62D 5/04
(52) U.S. Cl. ........................ 701/43; 701/41; 180/443
(58) Field of Search ........................... 701/29, 33, 41, 701/43, 76; 180/443, 446, 197

(56) References Cited

U.S. PATENT DOCUMENTS

| | | | | |
|---|---|---|---|---|
| 4,621,327 A | * | 11/1986 | Dolph et al. | 701/43 |
| 4,869,334 A | * | 9/1989 | Marumoto et al. | 701/43 |
| 5,001,641 A | * | 3/1991 | Makino | 180/197 |
| 5,016,249 A | | 5/1991 | Hurst et al. | |
| 5,074,626 A | * | 12/1991 | Kramer et al. | 701/76 |
| 5,259,473 A | | 11/1993 | Nishimoto et al. | 701/43 |
| 5,271,474 A | | 12/1993 | Nishimoto et al. | 701/43 |
| 5,360,077 A | * | 11/1994 | Nishimoto et al. | 701/43 |
| 5,440,487 A | * | 8/1995 | Althoff et al. | 701/43 |
| 5,448,480 A | * | 9/1995 | Rauner et al. | 701/43 |
| 5,479,081 A | | 12/1995 | Seibel et al. | |
| 5,504,679 A | | 4/1996 | Wada et al. | |
| 5,526,264 A | | 6/1996 | Niggemann et al. | |
| 5,588,118 A | | 12/1996 | Mandava et al. | |
| 5,656,897 A | | 8/1997 | Carobolante et al. | |
| 5,832,395 A | * | 11/1998 | Takeda et al. | 701/43 |
| 5,912,539 A | | 6/1999 | Sugitani et al. | |
| 5,980,081 A | * | 11/1999 | Watari et al. | 701/43 |
| 6,422,335 B1 | | 7/2002 | Miller | |
| 2001/0051845 A1 | * | 12/2001 | Itoh | 701/43 |

FOREIGN PATENT DOCUMENTS

| | | |
|---|---|---|
| DE | 4122016 | 1/1993 |
| WO | WO0146806 | 6/2001 |

OTHER PUBLICATIONS

Fruehling, Terry L., "Delphi Secured Microcontroller Architecture", Delphi Delco Electronics Systems, pp. 33–42, Copyright © 2000 Society of Automotive Engineers, Inc.

* cited by examiner

Primary Examiner—Gary Chin
(74) Attorney, Agent, or Firm—Tarolli, Sundheim, Covell & Tummino L.L.P.

(57) ABSTRACT

An electric power assisted steering system (10) for a vehicle comprises a steering gear (12) having a rack bar (26) and a housing (24). The rack bar (26) is movable linearly relative to the housing (24) for turning steerable wheels (34 and 36) of the vehicle. An electric motor (14) is coupled with the rack bar (26) of the steering gear (12). Energization of the electric motor (14) causes linear movement of the rack bar (26) relative to the housing (24). At least one vehicle condition sensor senses a vehicle condition and generates a signal indicative of the vehicle condition. A motor current sensor (22) senses an actual current of the electric motor (14) and generates a signal indicative of the actual motor current. A single integrated circuit (16) includes a main processor (64) and a monitoring processor (66). The main processor (64) controls the actual motor current delivered to the electric motor (14). The monitoring processor (66) determines if the main processor (64) is properly functioning.

22 Claims, 3 Drawing Sheets

ELECTRIC POWER ASSISTED STEERING SYSTEM HAVING A SINGLE INTEGRATED CIRCUIT WITH TWO PROCESSORS

TECHNICAL FIELD

The present invention relates to an electric power assisted steering system.

BACKGROUND OF THE INVENTION

Known electric power assisted steering systems include two controllers. A main controller receives signals from a vehicle speed sensor and a torsion sensor. In response to the received signals, the main controller generates an output signal to control an electric motor that provides steering assistance for turning steerable wheels of a vehicle. A secondary controller also receives signals from the vehicle speed sensor and the torsion sensor. In response to the received signals, the secondary controller determines a desired motor torque for the electric motor. The secondary controller also receives a signal from a motor current sensor that senses the actual current of the electric motor. The secondary controller compares the desired motor torque to the actual motor current and, if the difference between the desired motor torque and the actual motor current exceeds a predetermined value, the secondary controller disables the electric motor. Such a system is described in U.S. Pat. Nos. 5,259,473 and 5,271,474.

Two controllers increase both the size and the cost of the electric power assisted steering system. Additionally, since signals from the vehicle speed and the torsion sensors are input into each controller, the installation requires a separate electrical connection to each controller.

SUMMARY OF THE INVENTION

The present invention is an electric power assisted steering system for a vehicle. The electric power assisted steering system comprises a steering gear having a rack bar and a housing. The rack bar is movable linearly relative to the housing for turning steerable wheels of the vehicle. An electric motor is coupled with the rack bar of the steering gear. Energization of the electric motor causes linear movement of the rack bar relative to the housing. At least one vehicle condition sensor senses a vehicle condition and generates a signal indicative of the vehicle condition. A motor current sensor senses an actual current of the electric motor and generates a signal indicative of the actual motor current. A single integrated circuit includes a main processor and a monitoring processor. The main processor receives the at least one vehicle condition signal and, in response, controls the electric motor by controlling the actual motor current delivered to the electric motor. The monitoring processor receives the at least one vehicle condition signal and, in response, determines a desired motor torque. The monitoring processor also receives the actual motor current signal and compares the actual motor current to the desired motor torque to determine if the actual motor current is in an acceptable range and thus, determine if the main processor is properly functioning.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
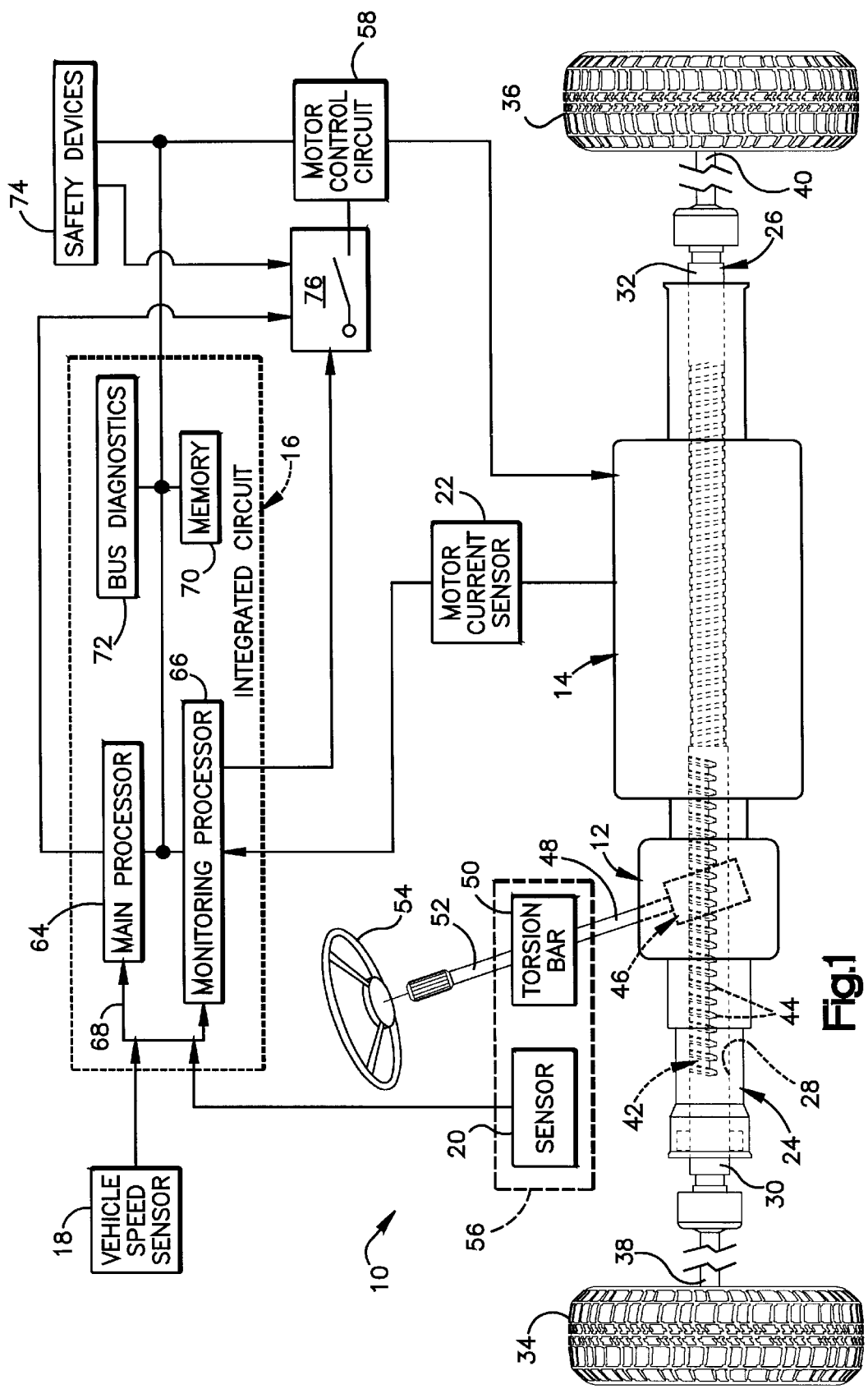
FIG. 1 is a schematic representation of an electric power assisted steering system constructed in accordance with the present invention.

FIG. 1 is a schematic representation of an electric power assisted steering system 10 constructed in accordance with the present invention. The electric power assisted steering system 10 includes a steering gear 12, an electric motor 14, a single integrated circuit 16, and a plurality of sensors 18, 20 and 22.

The steering gear 12 illustrated in FIG. 1 is a rack and pinion steering gear. The steering gear 12, illustrated in FIG. 1, includes a housing 24 and a rack bar 26. The housing 24 includes an axially extending passage 28. A portion of the rack bar 26 extends through the axially extending passage 28 of the housing 24. Axially opposite ends 30 and 32 of the rack bar 26 are connected with the steerable wheels 34 and 36, respectively, of the vehicle through tie rods 38 and 40. An upper surface 42 of the rack bar 26 includes a plurality of teeth 44.

A pinion gear passage (not shown) tangentially intersects the axially extending passage 28 within the housing 24 of the steering gear 12. A pinion gear 46 is located in the pinion gear passage. The pinion gear 46 has a plurality of teeth (not shown) that are in meshing engagement with the plurality of teeth 44 of the rack bar 26.

An output shaft 48 is connected to the pinion gear 46 and extends outward of the steering gear housing 24. The output shaft 48 is connected to the bottom end of a torsion bar 50. An input shaft 52 connects an upper end of the torsion bar 50 with the steering wheel 54 of the vehicle. The torsion bar 50 is configured to twist when a torque of a predetermined magnitude is applied across the torsion bar 50. Thus, if the vehicle driver turns the steering wheel 54 and there is little resistance to the turning of the steerable wheels 34 and 36, the torsion bar 50 will not twist and the output shaft 48 will rotate with the rotation of the input shaft 52. As a result, the pinion gear 46 will rotate causing the rack bar 26 to move linearly to turn the steerable wheels 34 and 36 of the vehicle. If there is sufficient resistance to the turning of the steerable wheels 34 and 36, a torque greater than the predetermined magnitude will be applied across the torsion bar 50. As a result, the input shaft 52 will rotate relative to the output shaft 48, twisting the torsion bar 50.

As shown in FIG. 1, the electric power assisted steering system 10 also includes a torsion sensor 20 that is operatively connected across the input shaft 52 and the output shaft 48, as shown schematically at 56. The torsion sensor 20 senses the rotation of the input shaft 52 relative to the output shaft 48 and generates a signal indicative of the relative rotation, i.e., torsion.

The electric power assisted steering system 10 further includes a vehicle speed sensor 18. The vehicle speed sensor 18 senses the speed of the vehicle and generates a signal indicative of the vehicle speed.

In the preferred embodiment, an electric motor 14 is fixed to the steering gear housing 24, as illustrated in FIG. 1.

Energization of the electric motor 14 causes linear movement of the rack bar 26. Those skilled in the art will recognize that the electric motor 14 may alternatively be connected with the output shaft 48. If the electric motor 14 is connected to the output shaft 48, energization of the electric motor causes the output shaft 48 to rotate. Rotation of the output shaft causes the pinion gear 46 to rotate, thereby causing the rack bar 26 to move linearly.

The electric motor 14 is of a convention design. The electric motor 14 receives electrical power from a motor control circuit 58. The motor control circuit 58 will be discussed in further detail below. The electrical power energizes the electric motor 14. Upon energization, a rotor (not shown) of the electric motor 14 rotates. The rotor is connected to a device such as a ballnut (not shown) for translating rotation of the rotor into linear movement of the rack bar 26 within the housing 24. If the rotor rotates in a first direction, the rack bar 26 will move to the left, as viewed in FIG. 1. If the rotor rotates in a second direction, opposite the first direction, the rack bar 26 will move to the right, as viewed in FIG. 1. The direction of rotation of the rotor of the electric motor 14 and the torque generated by the electric motor 14 are dependent upon the electrical power received from the motor control circuit 58.

A motor current sensor 22 is electrically connected to the electric motor 14. The motor current sensor 58 senses the actual current at which the electric motor 14 is operating and generates a signal indicative of the actual current.

The electric power assisted steering system 10 further includes a single integrated circuit 16. The integrated circuit 16 includes a main processor 64 and a monitoring processor 66. A common bus 68 within the integrated circuit 16 receives the signals generated by the torsion sensor 20 and the vehicle speed sensor 18 and transmits the signals to both the main processor 64 and the monitoring processor 66.

The main processor 64 receives the signals from the torsion sensor 20 and the vehicle speed sensor 18 and runs a known control algorithm to generate a motor control signal. The main processor 64 preferably is a digital signal processor. The main processor 64 controls the electric motor 14 by controlling the actual motor current delivered to the electric motor 14.

The monitoring processor 66 also receives the signals from the torsion sensor 20 and the vehicle speed sensor 18. The monitoring processor 66 further receives the signal indicative of the actual motor current from the motor current sensor 22. The monitoring processor 66 runs a monitoring process to determine if the main processor 64 is properly functioning.

Figure 2:
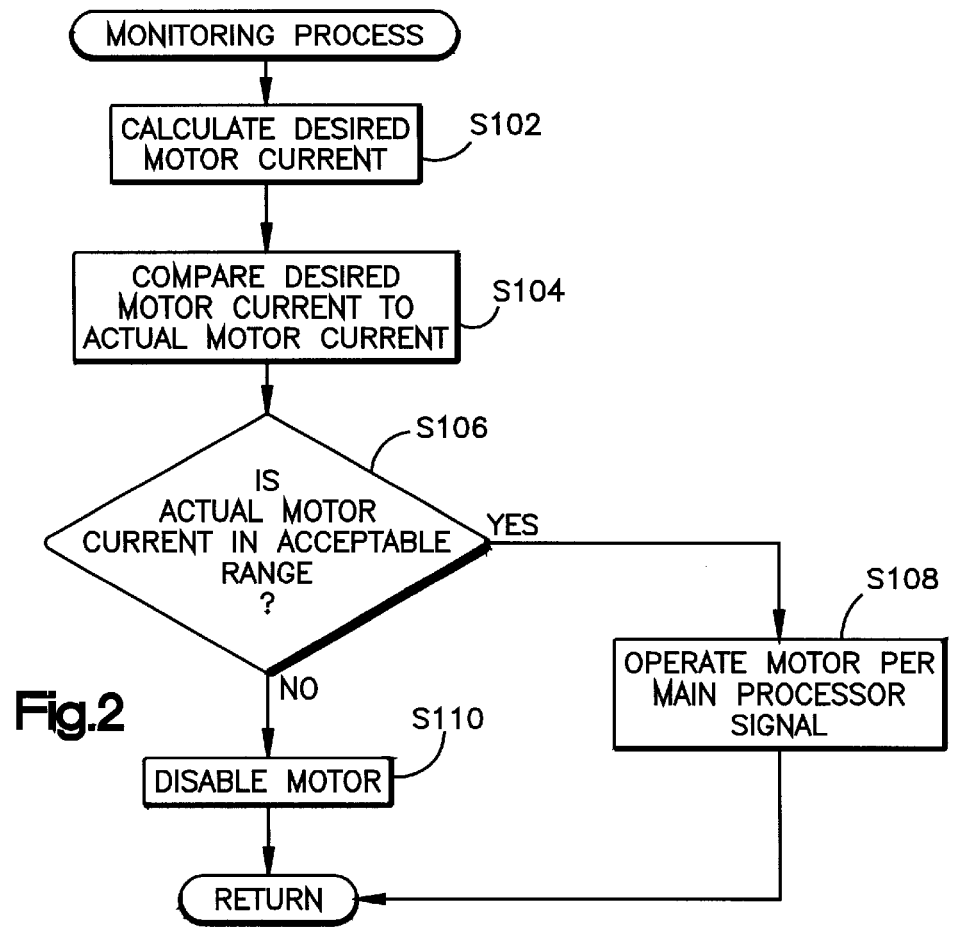
FIG. 2 is a flowchart of the monitoring process performed by the monitoring processor of FIG. 1.

The process steps of the monitoring process are shown by the flowchart of FIG. 2. At step S102, the monitoring processor 66 runs a known monitoring algorithm to calculate a desired motor current for the electric motor 14 based upon the vehicle speed and torsion signals received. At step S104, the monitoring processor 66 compares the desired motor current to the actual motor current received from the motor current sensor 22. In step S106, the monitoring processor 66 determines if the actual motor current is in an acceptable range, as compared to the desired motor current. If the actual motor current is in the acceptable range, the monitoring processor 66 allows the main processor 64 to continue to control the electric motor 14 by controlling the actual motor current delivered to the electric motor 14, as shown by step S108. If the actual motor current is not in the acceptable range, the monitoring processor 66 sends a disable signal to the motor control circuit 58 to discontinue the supply of electrical power to the electric motor 14, as shown in step S110.

Since the monitoring processor 66 compares the desired motor current to the actual motor current, the monitoring processor 66 may lag the main processor 64. Thus, the monitoring processor 66 preferably is a microprocessor, which may have a slightly longer processing time than the digital signal processor forming the main processor 64.

The main processor 64 of the single integrated circuit 16 also checks the monitoring processor 66 to ensure that the monitoring processor 66 is operating. The main processor 64 does no other checks of the monitoring processor 66 other than a check to determine if the monitoring processor 66 is operating.

Figure 3:
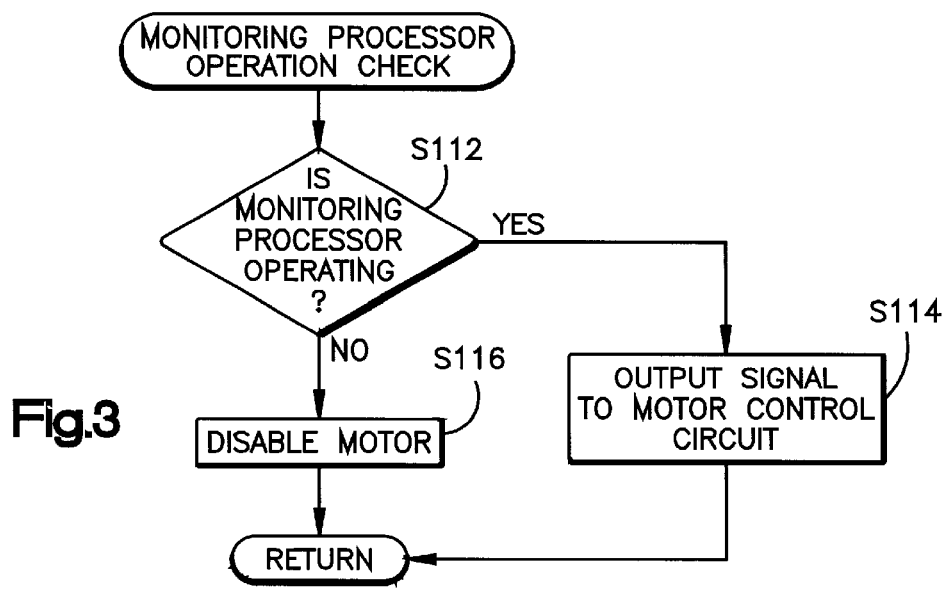
FIG. 3 is a flowchart of a monitoring processor operation check performed by the main processor of FIG. 1.

FIG. 3 shows a flowchart of the operation check of the monitoring processor 66. In step S112, the main processor 64 determines if the monitoring processor 66 is operating. To determine if the monitoring processor 66 is operating, the main processor 64 looks to see if the monitoring processor 66 is calculating the desired motor current based upon the vehicle speed and torsion signals received by the monitoring processor 66. This is accomplished by monitoring intermediate calculations such as timing signals. If the main processor 64 determines that the monitoring processor 66 is operating, the main processor 64 continues to control the actual motor current delivered to the electric motor 14, as shown in step S114. If the main processor 64 determines that the monitoring processor 66 is not operating, the main processor 64 sends a disable signal to the motor control circuit 58 to discontinue the supply of electrical power to the electric motor 14, as shown in step S116.

The single integrated circuit 16 further includes memory 70 and bus diagnostics 72. The memory 70 stores both the control algorithm of the main processor 64 and the monitoring algorithm of the monitoring processor 66. The bus diagnostics 72 monitor the bus 68 to ensure that the bus 68 is operating properly. For example, signals from each sensor, including the motor current sensor 22, may be input into the bus 68. Each signal input into the bus 68 has a bus address indicating the processor to which the signal should be transferred. The bus diagnostics 72 monitors the bus 68 to ensure that each signal is transferred to the appropriate processor.

The electric power assisted steering system 10 further includes safety devices 74. The safety devices 74 are electrically connected to both the main processor 64 and the monitoring processor 66. The safety devices 74 monitor both the main processor 64 and the monitoring processor 66 to further ensure that each processor is operational.

Figure 4:
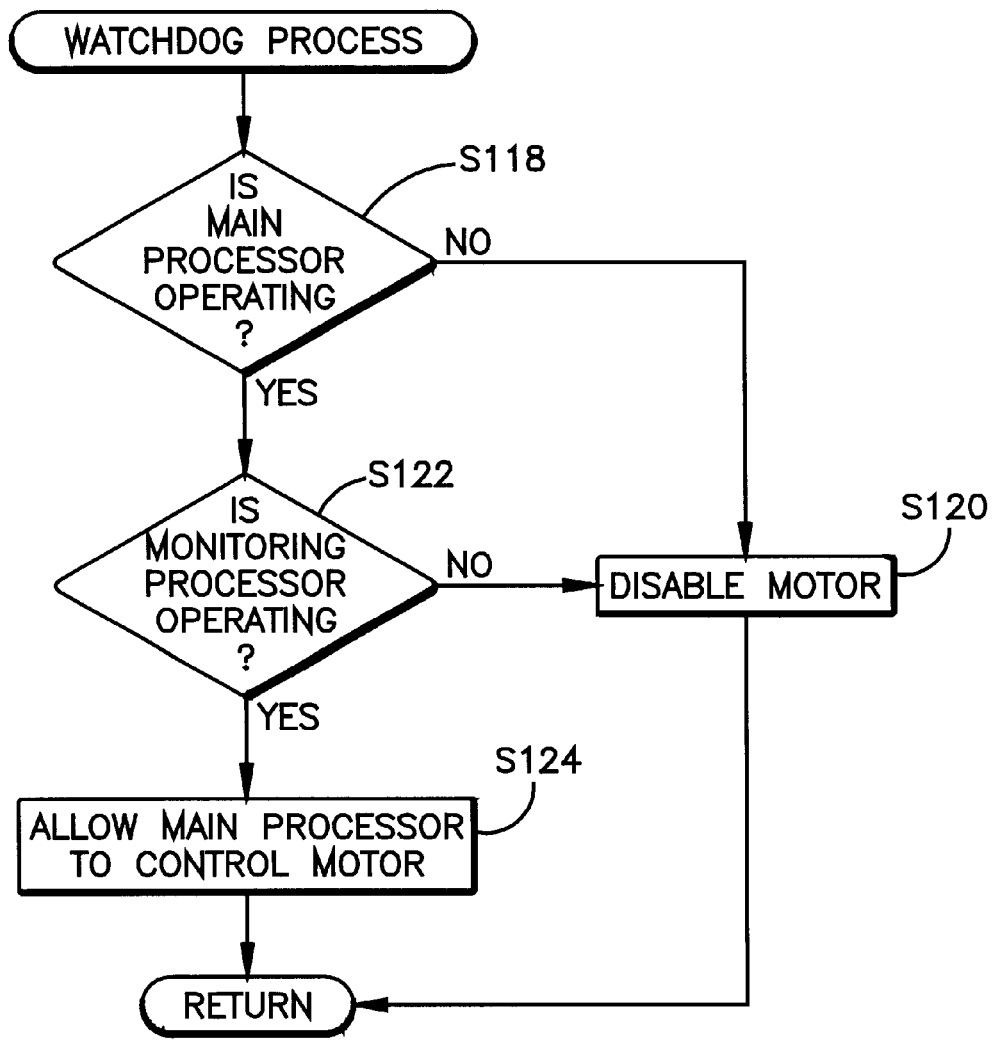
FIG. 4 is a flowchart of a watchdog process performed by safety devices of FIG. 1.

FIG. 4 shows a flowchart of the process of the safety devices 74. At step S118, the safety devices determine if the main processor 64 is operational. If the main processor 64 is not operational, the safety devices 74 send a disable signal to the motor control circuit 58 to discontinue the electrical power supplied to the electric motor 14, as shown in step S120. If the main processor 64 is operational, the safety devices 74 determine if the monitoring processor 66 is operational, at step S122. If the monitoring processor 66 is not operational, then the safety devices 74 send a disable signal to the motor control circuit 58 to discontinue the electrical power supplied to the electric motor 14, as shown in step S120. If the monitoring processor 66 is operational, then as shown in step S124, the main processor 64 is allowed to continue to control the actual motor current delivered to the electric motor 14.

The motor control circuit 58 of the electric power assisted steering system 10 is controllably connected to a plurality of power switches (not shown). The power switches receive the motor control signal generated by the main processor 64 and, in response, control the application of electrical power to the electric motor 14. The power switches controllably connect a source of electrical energy (not shown), such as the vehicle battery, from a relay circuit 76 to the electric motor 14. The motor control signal generated by the main processor 64 also controls the power switches and the operation of the relay circuit 76.

The motor control circuit 58 receives the motor control signal generated by the main processor 64. The motor control signal indicates a direction of rotation and an actual motor current to be delivered to the electric motor 14. Based upon the motor control signal, the power switches deliver electrical power of an amount equal to the actual motor current to the electric motor 14 from a relay circuit 76.

The relay circuit 76 of the motor control circuit 58 has two positions, a closed position and an open position. The relay circuit 76 is normally in the open position. The main processor and the monitoring processor actuate the relay circuit 76 from the open position to the closed position. When the relay circuit 76 is in the open position, no electrical power is delivered to the electric motor 14. When no electrical power is delivered to the electric motor 14, the vehicle can still be steered through the mechanical connection between the steering wheel 54 and the steerable wheels 34 and 36. When the relay circuit 76 is in the closed position, electrical power may be delivered to the electric motor 14. As stated above, any one of the main processor 64, monitoring processor 66, and the safety devices 74 may send a disable signal to actuate the relay circuit 76 from the closed position to the open position. Actuation of the relay circuit 76 from the closed position to the open position discontinues the supply of electrical power to the electric motor 14.

An electric power assisted steering system 10 having a single integrated circuit 16 with both a main processor 64 and a monitoring processor 66 provides many advantages over known systems. First, cost of the system 10 is decreased since only one integrated circuit 16 is required. Second, the size of the system 10 is decreased over a system having two controllers. Third, installation of the system 10 into a vehicle is simplified as compared to the prior art. A single integrated circuit 16 having a bus 68 allows a single electrical connection between each vehicle condition sensor and the integrated circuit, thus eliminating labor and materials needed to separately connect a sensor to multiple controllers.

From the above description of the invention, those skilled in the art will perceive improvements, changes and modifications. One such change is to include a second relay at the star point of a brushless DC or AC motor. Another is to compare the direction, or sign, of torque required with the sign of the quadrature current computed from measured current in a permanent magnet brushless AC motor. A further variation is to compare the sign or direction of the torque required with the commutation sequence of a brushless DC or variable reluctance motor. Such improvements, changes and modifications within the skill of the art are intended to be covered by the appended claims.

What is claimed is:

1. An electric power assisted steering system for a vehicle, the electric power assisted steering system comprising:

a steering gear having a rack bar and a housing, the rack bar being movable linearly relative to the housing for turning steerable wheels of the vehicle;

an electric motor, energization of the electric motor causing linear movement of the rack bar relative to the housing;

at least one vehicle condition sensor for sensing a vehicle condition and generating a signal indicative of the vehicle condition;

a motor current sensor for sensing an actual current of the electric motor and generating a signal indicative of the actual motor current; and a single integrated circuit including a main processor and a monitoring processor, the main processor receiving the at least one vehicle condition signal and, in response, controlling the electric motor by controlling the actual motor current delivered to the electric motor, the monitoring processor receiving the at least one vehicle condition signal and, in response, determining a desired motor current, the monitoring processor also receiving the actual motor current signal and using the actual motor current to determine if the actual motor current is in an acceptable range and thus, determining if the main processor is properly functioning, the main processor being a digital signal processor; and the monitoring processor being a microprocessor, the microprocessor having a longer processing time than the digital signal processor so that the monitoring processor lags the main processor.

2. The electric power assisted steering system of claim 1 further being defined by:

the monitoring processor comparing the actual motor current to the desired motor current to determine if the actual motor current is in the acceptable range.

3. The electric power assisted steering system of claim 1 further being defined by:

the monitoring processor comparing a sign of a quadrature current computed from the actual motor current to a sign of the desired motor-current to determine if a direction of rotation of the electric motor is acceptable.

4. The electric power assisted steering system of claim 1 further being defined by:

the monitoring processor comparing a commutation sequence computed from the actual motor current to a sign of the desired motor current to determine if a direction of rotation of the electric motor is acceptable.

5. The electric power assisted steering system of claim 1 further being defined by:

the at least one vehicle condition sensor being a vehicle speed sensor for sensing vehicle speed and generating a signal indicative of the vehicle speed.

6. The electric power assisted steering system of claim 1 further being defined by:

the at least one vehicle condition sensor being a torsion sensor for sensing torsion across a torsion bar of the steering gear and generating a signal indicative of the torsion.

7. The electric power assisted steering system of claim 1 further including:

a motor control circuit receiving a signal from the main processor and controlling the actual motor current in response to the signal, the motor control circuit including a relay having a closed position for delivering electrical power to the electric motor and an open position for preventing the delivery of electrical power to the electric motor.

8. The electric power assisted steering system of claim 7 further being defined by:

the main processor being electrically connected to the monitoring processor, the main processor monitoring the monitoring processor to determine if the monitoring processor is operating, the main processor sending a signal to the motor control circuit to open the relay if the main processor determines that the monitoring processor is not operating.

9. The electric power assisted steering system of claim 7 further being defined by:
the monitoring processor being electrically connected to the motor control circuit,
the monitoring processor sending a signal to the motor control circuit to open the relay when the monitoring processor determines that the main processor is not properly functioning.

10. The electric power assisted steering system of claim 7 further being defined by:
safety devices being electrically connected to both the main processor and the motor control circuit,
the safety devices sending a signal to the motor control circuit to open the relay when the safety devices determine that the main processor is not properly functioning.

11. The electric power assisted steering system of claim 10 further being defined by:
safety devices being electrically connected to both the monitoring processor and the motor control circuit,
the safety devices sending a signal to the motor control circuit to open the relay when the safety devices determine that the monitoring processor is not properly functioning.

12. The electric power assisted steering system of claim 1 further including:
a common bus supplying the signal from the at least one vehicle condition sensor to both the main processor and the monitoring processor, the common bus being formed in the single integrated circuit.

13. The electric power assisted steering system of claim 1 further being defined by:
the electric motor being coupled to the rack bar in a location spaced axially along the rack bar relative to a pinion gear of the steering gear.

14. The electric power assisted steering system of claim 1 further including:
a ballnut for coupling the electric motor to the rack bar.

15. The electric power assisted steering system of claim 1 further including:
a pinion gear in meshing engagement with the rack bar, the electric motor causing rotation of the pinion gear, rotation of the pinion gear resulting in linear movement of the rack bar.

16. An apparatus associated with a vehicle, the apparatus comprising:
a device that is operable for performing an automotive function;
at least one vehicle condition sensor for sensing a vehicle condition and for providing a vehicle condition signal indicative of the sensed vehicle condition;
a device sensor for sensing a condition of the device and for providing a device condition signal indicative of the sensed device condition; and
a single integrated circuit including a main processor and a monitoring processor, the main processor receiving the vehicle condition signal and being responsive to the vehicle condition signal for controlling operation of the device, the monitoring processor receiving the vehicle condition signal and being responsive to the vehicle condition signal for determining a desired condition of the device, the monitoring processor also receiving the device condition signal and determining whether the main processor is properly controlling operation of the device, the main processor and the monitoring processor being dissimilar processors with the main processor having a faster processing time than the monitoring processor so that the monitoring processor lags the main processor.

17. The apparatus of claim 16 further being defined by:
the main processor being a digital signal processor and the monitoring processor being a microprocessor.

18. The apparatus of claim 16 further being defined by:
the single integrated circuit including a common bus, the common bus supplying the vehicle condition signal to both the main processor and the monitoring processors.

19. The apparatus of claim 16 further being defined by:
the device being an electric power assisted steering system for the vehicle, the electric power assisted steering system including a steering gear having a rack bar and a housing, the rack bar being movable relative to the housing for turning steerable wheels of the vehicle, the electric power assisted steering system further including an electric motor, energization of the electric motor causing linear movement of the rack bar relative to the housing.

20. The apparatus of claim 19 further being defined by:
the device sensor sensing a current of the electric motor and the desired condition of the device being a desired current for the electric motor.

21. The electric power assisted steering system of claim 19 further being defined by:
the electric motor being coupled to the rack bar in a location spaced axially along the rack bar relative to a pinion gear of the steering gear.

22. The electric power assisted steering system of claim 19 further being defined by:
the electric power assisted steering system including a pinion gear that is in meshing engagement with the rack bar, the electric motor causing rotation of the pinion gear, rotation of the pinion gear resulting in linear movement of the rack bar.

* * * * *

UNITED STATES PATENT AND TRADEMARK OFFICE
CERTIFICATE OF CORRECTION

PATENT NO.    : 6,760,653 B2
DATED         : July 6, 2004
INVENTOR(S)   : Joseph D. Miller It is certified that error appears in the above-identified patent and that said Letters Patent is hereby corrected as shown below:

<u>Column 7,</u>
Line 42, after "claim" delete "1" and insert -- 13 --.

Signed and Sealed this

Twenty-first Day of June, 2005

JON W. DUDAS
*Director of the United States Patent and Trademark Office*